Patented Sept. 24, 1929

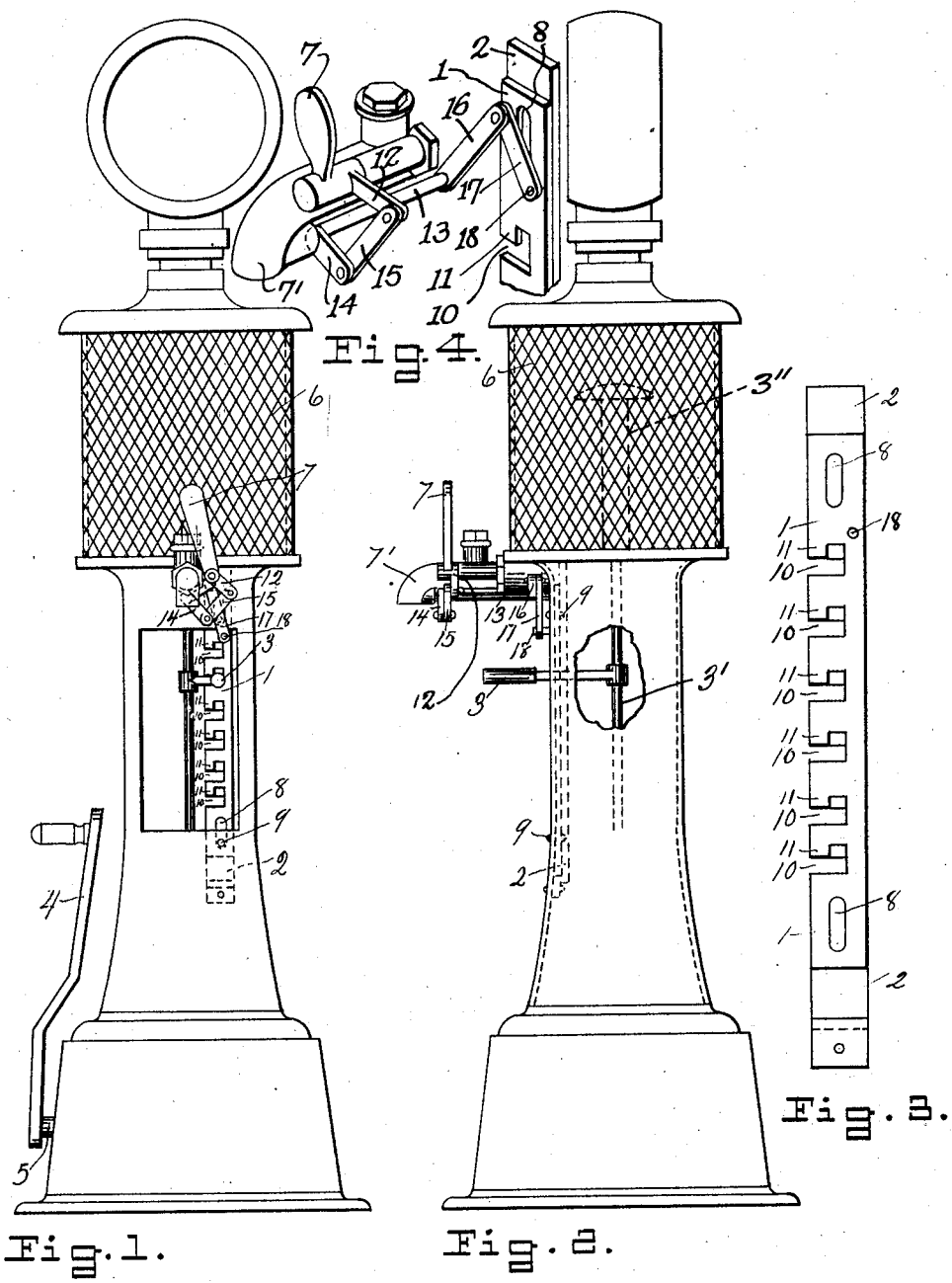

1,728,923

UNITED STATES PATENT OFFICE

FREDRICH WILLIAM A. BRUESKE, OF MADISON, WISCONSIN

SAFETY LOCK FOR GASOLINE DISPENSERS

Application filed December 8, 1924. Serial No. 754,695.

This invention relates to liquid measuring dispensers and more especially to the well known gasoline pumps which are commonly employed for measuring and dispensing gasoline to motorists and has for one of its objects to provide a mechanism which may be readily attached to such a pump and which will prevent the manipulating of the mechanism which varies the effective capacity of the measuring chamber, while the gasoline is being dispensed, whereby under present conditions, it is possible for unscrupulous persons to defraud the purchaser out of a portion of the measured fluid.

In one form of gasoline pump in common use, there is employed a means for varying the capacity of the measuring chamber which includes a stationary vertical bar having a series of notches or recesses in one edge thereof and associated with such bar there is an oscillative handle member which is carried by a vertical rod or shaft which in turn is connected to an overflow pipe which may be adjusted to various heights within a measuring chamber. The notches or recesses in the first mentioned bar are usually equidistantly spaced and the parts are so arranged that when the overflow pipe is adjusted to a particular height within the measuring chamber and the handle member oscillated, it will be received within a predetermined notch which serves not only as an indicator of the amount of liquid measured but also to retain the handle and its associated parts in a set position.

With such a construction, it is, nevertheless, possible for unscrupulous parties to defraud the purchaser out of a portion of the gasoline which is measured in the measuring chamber, if during the discharge of the gasoline from such chamber, the handle member is moved out of the notch in which it has been placed and the overflow pipe allowed to drop, whereby a portion of the gasoline which has been measured will be permitted to return to the supply tank through the over-flow instead of being discharged through the discharge nozzle.

It is the primary object of the present invention to provide means which may be readily associated with the notched bar above described and which may preferably be connected to the handle or operating means of the discharge valve and which will be automatically actuated by the operation of such valve to its open position to lock the measuring handle member above described in the indicating notch of the bar in which it has been placed originally.

With the above and other objects in view, the invention consists in the novel details of construction and combinations of parts more fully hereinafter described and particularly pointed out in the appended claims.

Referring to the accompanying drawing in which like numerals indicate like parts in all the views:

Figure 1 is a front elevational view of a gasoline measuring pump of the type above described, showing my improved locking means in operative position thereon;

Fig. 2 is a side elevational view of the parts shown in Fig. 1; and,

Fig. 3 is an enlarged detail front elevational view of the notched quantity bar and the locking bar constituting the present invention.

Fig. 4 is a perspective view of the locking bar operating mechanism.

Referring more particularly to the said drawing, the numeral 2 indicates the fixed vertical notched quantity bar of a well known form of gasoline measuring dispenser, which has associated with it, an oscillating handle member 3 carried by a vertical rod or shaft 3' which in turn is suitably connected to an overflow pipe 3'' mounted in a glass or other suitable measuring chamber 6. As is well known in the art, the amount of liquid to be dispensed by this type of pump is determined by shifting the rod 3' and the overflow pipe 3'' up or down by means of the handle member 3 until the latter is opposite the desired notch in the bar 2 whereupon the said handle is oscillated to enter such notch. The gasoline is then pumped into the chamber 6 by any suitable means such for example, as the pump operating handle 4 carried by the stud 5 adjacent the base of the pump, until the chamber 6 is filled to the height of the overflow pipe 3''.

Any excess liquid above the desired quantity which enters the chamber 6 will be returned to the supply tank through the overflow pipe and when the liquid level has finally adjusted itself to the top of the overflow, a discharge valve handle 7 is moved to open the discharge valve whereupon the gasoline will flow from the chamber 6 through the discharge nozzle 7' to the automobile tank or other receptacle.

In order to prevent the manipulation of the overflow 3" during the discharge operation, I provide a bar 1, which is slidably mounted upon the front of the quantity bar 2 by means of the pins or studs 9 working in the elongated slots or openings 8 with which the bar 1 is provided. The said bar 1 is likewise provided with a plurality of substantially L-shaped notches or recesses 10 which are spaced to correspond with the notches of the quantity bar 2, as will be readily understood from the drawings. The L-shape of these notches 10 provides locking hooks or projections 11 which are adapted to move down in front of the shank of the handle member 3 after it has been introduced into a predetermined notch of the quantity bar and thereby prevent such handle member from being withdrawn from such notch.

The vertical sliding movements of the bar 1 may be accomplished in any desired manner but it is preferred to connect the said bar to the valve actuating handle 7 whereby when the discharge valve is open the said bar 1 will be slid downwardly to bring the hooks or projections 11 into the path of the handle member 3 and lock it in position. As here shown, these connections may comprise an arm 12 which is rigidly connected with the handle member 7 so as to oscillate therewith. The said arm is connected by means of a link member 15 to one arm 14 of a bell crank member which comprises a horizontally extending shaft 13 which carries the said arm 14 at one end and an arm 16 at its other end, which latter arm is preferably arranged at a substantial angle to the arm 14. The said arm 16 is pivotally connected to one end of a link 17, the other end of which is pivotally connected at 18 to the sliding bar 1. It results from the construction just described, that when the handle member 7 is moved to the right, as viewed in Fig. 1, its motion will be transmitted through the arm 12, link 15, arm 14, shaft 13, arm 16 and link 17, to the slide bar 1, whereby the latter will be moved downwardly, as viewed in the said figure, to cause its hooks or projections 11 to be disposed in front of the shank of the handle member 3, as will be readily understood. The shank will thus be positively locked within the particular notch of the quantity bar in which it has been placed and it cannot be withdrawn therefrom so long as the discharge valve is open.

It will thus be seen that the present invention provides a simple and effective means whereby the quantity regulating handle of a visible gasoline pump may be effectively locked in a predetermined position and retained therein during the discharge of the gasoline from the measuring chamber, and furthermore, that said locking means may be automatically actuated by manipulation of the discharge valve, the locking means being moved into position when the discharge valve is opened and released when the discharge valve is again closed.

While one form of the invention has been illustrated and described, it is obvious that those skilled in the art may vary the details of construction as well as the precise arrangements of parts and therefore, it is not wished to be limited to the above disclosure except as may be required by the claims.

What I claim is:

1. In a liquid measuring pump, a measuring chamber; a valved outlet for said chamber; vertically adjustable means for varying the effective capacity of said chamber; a notched quantity-measuring bar associated with said varying means; a locking bar carried by said measuring bar, adapted to prevent adjustment of said varying means; and lever and link connections between said locking bar and the valve of said outlet, for moving the former to locking position when the latter is opened.

2. In a liquid measuring pump, a measuring chamber; a valved outlet for said chamber; vertically adjustable means for varying the effective capacity of said chamber; a notched quantity-measuring bar associated with said varying means; a locking bar having L-shaped slots, slidably carried by said measuring bar, adapted to prevent adjustment of said varying means; and lever and link connections between said locking bar and the valve of said outlet, for longitudinally sliding the former to locking position when the latter is opened.

3. In a liquid measuring pump, a measuring chamber; an outlet valve for said chamber, having an operating handle; vertically adjustable means for varying the effective capacity of said chamber; a notched quantity-measuring bar associated with said varying means; a locking bar slidably carried by said measuring bar, adapted to prevent adjustment of said varying means; a link connected to said locking bar; a bell crank member, one of the arms of which is connected to said link; a second link connected to the other arm of said bell crank member; and a lever arm rigid with said valve operating handle, connected with said second link.

4. A locking device for the effective capacity varying elements of liquid measuring and dispensing pumps of the type provided with an elongated notched quantity-measuring bar and a manually operable outlet valve, comprising an elongated bar having a plurality of substantially L-shaped slots in one edge thereof, adapted to be longitudinally slidably mounted on said quantity-measuring bar; and lever and link means for connecting said locking bar with the operating handle of said outlet valve.

In testimony whereof I affix my signature.
FREDRICH WILLIAM A. BRUESKE.